United States Patent
Fujii et al.

(10) Patent No.: US 7,085,477 B2
(45) Date of Patent: Aug. 1, 2006

(54) TELEVISION APPARATUS

(75) Inventors: Haruhiko Fujii, Osaka (JP);
Kazuyoshi Kuwabata, Osaka (JP);
Shigeru Yokota, Osaka (JP); Satoshi Shimoda, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 1139 days.

(21) Appl. No.: 10/000,859

(22) Filed: Oct. 24, 2001

(65) Prior Publication Data

US 2002/0051093 A1     May 2, 2002

(30) Foreign Application Priority Data

Oct. 27, 2000     (JP)     ............................. 2000-329235

(51) Int. Cl.
*H04N 5/91* (2006.01)
*H03G 3/00* (2006.01)
*G11B 20/10* (2006.01)

(52) U.S. Cl. ................ 386/96; 369/47.25; 369/124.11; 381/104; 381/107

(58) Field of Classification Search ............ 369/47.16, 369/47.25, 124.11, 134; 704/201; 386/46, 386/54, 96; 381/56, 61, 94, 104, 105, 108, 381/119, 107, 120

See application file for complete search history.

(56) References Cited

U.S. PATENT DOCUMENTS

| | | | | |
|---|---|---|---|---|
| 4,926,485 A | * | 5/1990 | Yamashita | .................. 381/107 |
| 4,962,494 A | * | 10/1990 | Kimura | .................... 369/47.25 |
| 5,548,655 A | * | 8/1996 | Takahashi | ................... 381/104 |
| 6,272,465 B1 | * | 8/2001 | Hewitt et al. | ............... 704/258 |

FOREIGN PATENT DOCUMENTS

| | | | |
|---|---|---|---|
| JP | 02-230554 | * | 9/1990 |
| JP | 5-36195 | | 9/1993 |
| JP | 05-267961 | * | 10/1993 |

* cited by examiner

*Primary Examiner*—Thai Tran
*Assistant Examiner*—Mishawn Dunn
(74) *Attorney, Agent, or Firm*—Osha Liang LLP

(57) ABSTRACT

A ROM 51 stores a plurality of volume set values and a plurality of level change rates corresponding to each other and an IC 5 accepts a volume set value specified by a user when carrying out volume setting. Moreover, it is decided whether a reproducing object is a CD or a DVD depending on a decision signal output from a loader section 1. A level change rate corresponding to the volume set value is output to an IC 2 if the reproducing object is the DVD, and the level change rate corresponding to the volume set value is adjusted at a predetermined adjusting rate and the level change rate thus adjusted is output to the IC 2 if the reproducing object is the CD. The IC 2 changes the level of an analog signal indicative of a voice input from the loader section 1 at the level change rate and outputs the signal to an amplifying circuit 3.

7 Claims, 8 Drawing Sheets

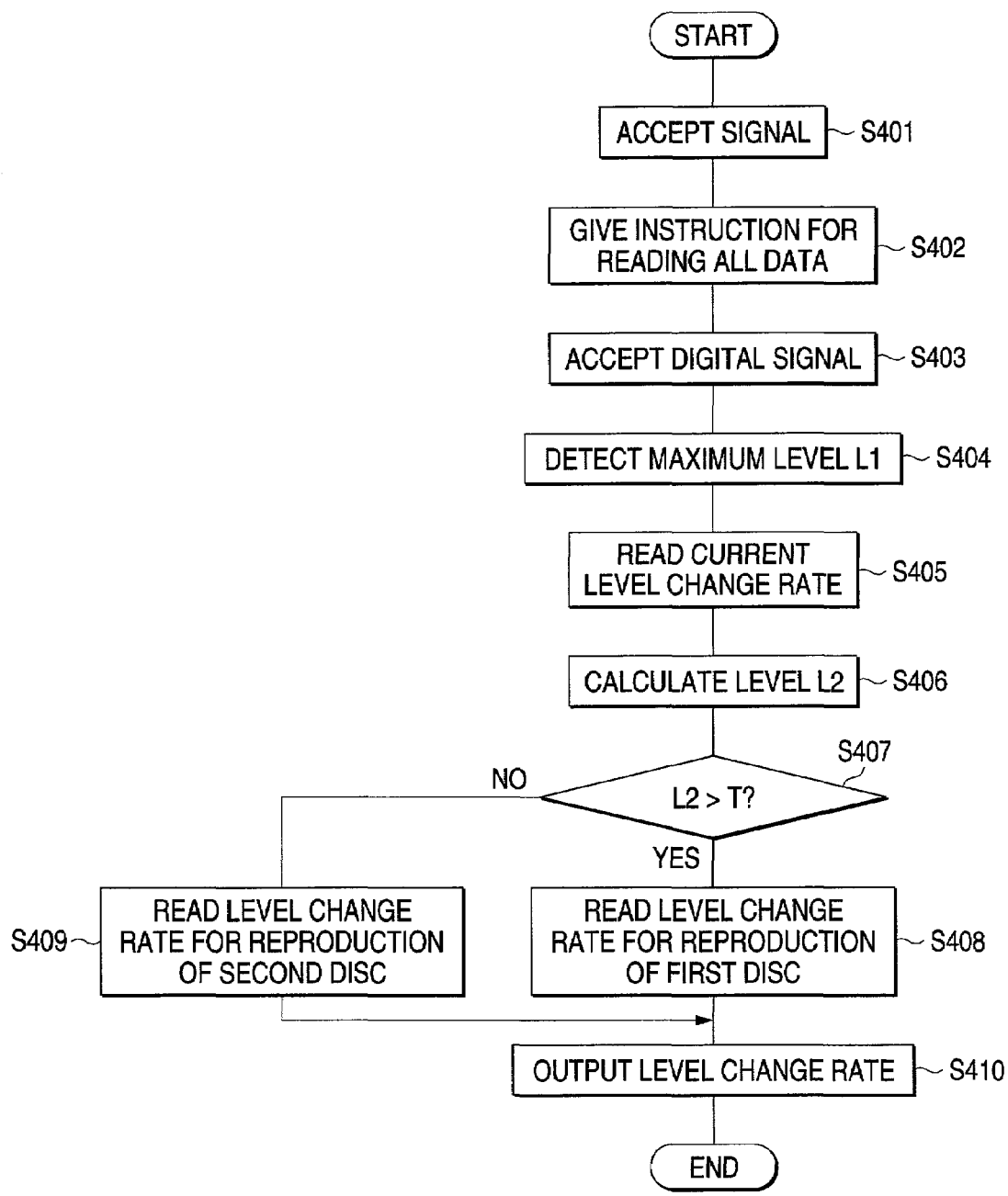

TELEVISION APPARATUS

BACKGROUND OF THE INVENTION

1. Technology of the Invention

The present invention relates to a television apparatus having a reproducing mechanism for reproducing data such as a voice or an image recorded in a recording medium such as a CD or a DVD.

2. Related Art

There is developed a television apparatus including a reproducing mechanism for reproducing data recorded in a DVD (Digital Versatile Disk, Digital Video Disc). Such a television apparatus capable of reproducing the data recorded in the DVD can also reproduce data recorded in another optical disc such as a CD (Compact Disc).

The recording level of data on a voice recorded in the DVD is lower than that of data on a voice recorded in the CD. A volume level is not changed after the CD is reproduced and a volume is reduced when the DVD is reproduced, and furthermore, the volume level is not changed when the DVD is reproduced and the volume is increased when the CD is reproduced. Therefore, there is a problem in that a user has a feeling of incompatibility. Accordingly, in the case in which the DVD is to be reproduced after the CD is reproduced or in which the CD is to be reproduced after the DVD is reproduced, the user should properly adjust the volume level.

Similarly, the recording levels of data on a voice recorded onto the CD and an LD (Laser Disc) are different from each other. In order to eliminate the drawback, the Unexamined Japanese Patent Application Publication No. Hei5-36195 has proposed a reproducing apparatus for adjusting the level of a voice signal separately when the CD is to be reproduced and when the LD is to be reproduced and for outputting a voice signal having a uniform level even if any of the CD and LD is to be reproduced.

[Problems to be Solved]

In the conventional television apparatus, however, the volume levels cannot be equalized when the DVD and the CD are to be reproduced. Moreover, the reproducing apparatus disclosed in the Unexamined Japanese Patent Application Publication No. Hei5-36195 serves to equalize volume levels when the CD and the LD are to be reproduced, and therefore, is not utilized for a television apparatus for reproducing the DVD.

SUMMARY OF THE INVENTION

The invention is made in consideration of the circumstances and has an object to provide a television apparatus for changing the level of a voice signal at a separate change rate when reproducing a CD and a DVD and for equalizing a volume level even if any of the CD and the DVD is to be reproduced.

[Means for Solving the Problems]

A first aspect of the invention is directed to a television apparatus comprising a reading section for reading data from a first recording medium recording data indicative of a voice and from a second recording medium recording data indicative of a voice and an image, a voice signal converting section for converting the data read by the reading section into a voice signal, an accepting section for accepting a volume set value indicative of a volume of a voice to be reproduced, and a storage section for storing a level change rate indicative of a rate for changing a level of the voice signal corresponding to a plurality of volume set values respectively, a level of the voice signal output from the voice signal converting section being changed based on the level change rate corresponding to the volume set value accepted by the accepting section, and deciding section for deciding whether a reproducing object is the first recording medium or the second recording medium, and change rate adjusting section for adjusting the level change rate corresponding to the volume set value accepted by the accepting section corresponding to a result of the decision obtained by the deciding section.

According to the television apparatus in accordance with the first aspect of the invention, the level change rate corresponding to the volume set value accepted by the accepting section is adjusted separately depending on whether the reproducing object is the first recording medium or the second recording medium, and the level of the voice signal is changed based on the level change rate. Consequently, it is possible to equalize the volume level at which the data of the first recording medium are to be reproduced and the volume level at which the data of the second recording medium are to be reproduced.

A second aspect of the invention is directed to the television apparatus according to the first aspect of the invention, wherein the change rate adjusting section serves to adjust, at a first adjusting rate, the level change rate corresponding to the volume set value accepted by the accepting section when the deciding section decides that the reproducing object is the first recording medium, and to adjust the level change rate at a second adjusting rate which is different from the first adjusting rate when the deciding section decides that the reproducing object is the second recording medium.

According to the television apparatus in accordance with the second aspect of the invention, the level change rate is adjusted by using the first adjusting rate when the reproducing object is the first recording medium and is adjusted by using the second adjusting rate when the reproducing object is the second recording medium. Thus, the level of the voice signal is changed. By properly determining the first adjusting rate and the second adjusting rate, accordingly, it is possible to equalize the volume level at which the data of the first recording medium are to be reproduced and the volume level at which the data of the second recording medium are to be reproduced. Moreover, one of the first adjusting rate and the second adjusting rate is set to 1, and the level change rate can be set to be unchanged by the adjustment when the adjusting rate is used and can be set to be changed by the adjustment only when the other change rate is used.

A third aspect of the invention is directed to a television apparatus comprising a reading section for reading data from a first recording medium recording data indicative of a voice and from a second recording medium recording data indicative of a voice and an image, a voice signal converting section for converting the data read by the reading section into a voice signal, and an accepting section for accepting a volume set value indicative of a volume of a voice to be reproduced, a voice represented by the voice signal being output with a volume corresponding to the volume set value accepted by the accepting section, and a storage section for storing a first level change rate indicative of a rate at which a level of a voice signal is to be changed and a second level change rate indicative of a rate at which the level of the voice signal is to be changed and different from the first level change rate corresponding to a plurality of volume set values respectively, deciding section for deciding whether a reproducing object is the first recording medium or the second recording medium, and a level changing section for changing the level of the voice signal based on the first level change rate corresponding to the volume set value accepted by the accepting section when the deciding section decides that the reproducing object is the first recording medium and for changing the level of the voice signal based on the second level change rate corresponding to the volume set value accepted by the accepting section when the deciding section decides that the reproducing object is the second recording medium.

According to the television apparatus in accordance with the third aspect of the invention, the first level change rate and the second level change rate corresponding to the volume set values respectively are previously stored in the storage section. The level of the voice signal is changed by using the first level change rate when the reproducing object is the first recording medium, and the level of the voice signal is changed by using the second level change rate when the reproducing object is the second recording medium. By properly determining the first level change rate and the second level change rate, accordingly, it is possible to equalize the volume level at which the data of the first recording medium are to be reproduced and the volume level at which the data of the second recording medium are to be reproduced.

A fourth aspect of the invention is directed to a television apparatus comprising a reading section for reading data from a first recording medium recording data indicative of a voice and from a second recording medium recording data indicative of a voice and an image, a voice signal converting section for converting the data read by the reading section into a voice signal, and an accepting section for accepting a volume set value indicative of a volume of a voice to be reproduced, a voice represented by the voice signal being output with a volume corresponding to the volume set value accepted by the accepting section, and a storage section for storing two different level change rates indicative of rates at which a level of the voice signal is to be changed corresponding to a plurality of volume set values respectively, a level detecting section for detecting a level of the voice signal output from the voice signal converting section, deciding section for deciding whether or not the level detected by the level detecting section exceeds a predetermined value, and a level changing section for selecting one of the two level change rates corresponding to the volume set value accepted by the accepting section based on a result of the decision obtained by the deciding section and for changing the level of the voice signal based on the level change rate thus selected.

According to the television apparatus in accordance with the fourth aspect of the invention, the two different level change rates corresponding to the volume set values respectively are previously stored in the storage section, and one of the level change rates is selected based on whether or not the level of the voice signal output from the voice signal output section exceeds the predetermined value and the level of the voice signal is changed by using the level change rate thus selected. By properly determining the two level change rates, accordingly, it is possible to equalize the volume level at which the voice data having a high recording level are to be reproduced and the volume level at which voice data having a low recording level are to be reproduced irrespective of the first recording medium and the second recording medium.

A fifth aspect of the invention is directed to the television apparatus according to the fourth aspect of the invention, wherein the level detecting section serves to read all data of the first recording medium or the second recording medium to be a reproducing object by the reading section and to detect a maximum level of a voice signal obtained after the conversion carried out by the voice signal converting section from all the data thus read.

According to the television apparatus in accordance with the fifth aspect of the invention, the maximum level of the voice signal obtained after the conversion is detected from all the data of the first recording medium or the second recording medium to be the reproducing object, and the magnitude of the recording level of the voice data recorded in the reproducing object is decided based on the result of the detection. Thus, it is possible to accurately decide the magnitude of the recording level and to more accurately equalize the volume level at which the voice data having a high recording level are to be reproduced and the volume level at which the voice data having a low recording level are to be reproduced.

A sixth aspect of the invention is directed to a television apparatus comprising a reading section for reading data from a first recording medium recording data indicative of a voice and from a second recording medium recording data indicative of a voice and an image, a voice signal converting section for converting the data read by the reading section into a voice signal, and an accepting section for accepting a volume set value indicative of a volume of a voice to be reproduced, a voice represented by the voice signal being output at a level corresponding to the volume set value accepted by the accepting section, and a storage section for storing two different level change rates indicative of rates at which a level of the voice signal is to be changed corresponding to a plurality of volume set values respectively, a level changing section for changing the level of the voice signal based on the two level change rates corresponding to the volume set value accepted by the accepting section, level detecting section for detecting the level of the voice signal obtained after the change carried out by the level changing section, calculating section for calculating a level of the voice signal which has not been changed by the level changing section based on the level detected by the level detecting section and the two level change rates corresponding to the volume set value accepted by the accepting section, and deciding section for deciding whether or not the level calculated by the calculating section exceeds a predetermined value, wherein the level changing section serves to select one of the two level change rates corresponding to the volume set value accepted by the accepting section based on a result of the decision obtained by the deciding section and to change the level of the voice signal based on the level change rate thus selected.

According to the television apparatus in accordance with the sixth aspect of the invention, the two different level change rates corresponding to the volume set values respectively are previously stored in the storage section, the level of the voice signal which has been changed by the level changing section is detected, and the level of the voice signal which has not been changed is calculated based on the result of the detection and the level change rate used for the change of the level which is carried out by the level changing section. One of the level change rates is selected based on whether or not the level exceeds the predetermined value, and the level of the voice signal is changed by using the level change rate thus selected. By properly determining the two level change rates, accordingly, it is possible to equalize the volume level at which the voice data having a high recording level are to be reproduced and the volume level at which the voice data having a low recording level are to be reproduced irrespective of the first recording medium and the second recording medium.

A seventh aspect of the invention is directed to the television apparatus according to the sixth aspect of the invention, wherein the level detecting section serves to read all data of the first recording medium or the second recording medium to be a reproducing object by the reading section and to detect a maximum level of a voice signal after the change carried out by the level changing section from all the data thus read.

According to the television apparatus in accordance with the seventh aspect of the invention, the maximum level of the voice signal obtained after the change of the level is detected from all the data of the first recording medium or the second recording medium to be the reproducing object, and the magnitude of the recording level of the voice data recorded in the reproducing object is decided based on the result of the detection and the level change rate used for changing the level by the level changing section. Thus, it is possible to accurately decide the magnitude of the recording level and to more accurately equalize the volume level at which the voice data having a high recording level are to be reproduced and the volume level at which the voice data having a low recording level are to be reproduced.

BRIEF DESCRIPTION OF THE DRAWINGS

FIG. 1 is a block diagram showing the structure of a television apparatus according to a first embodiment of the invention,
[FIG. 2]
FIG. 12 is a flow chart showing the processing procedure of an IC in the television apparatus according to the fourth embodiment.

DESCRIPTION OF THE PREFERRED EMBODIMENTS

MODE FOR CARRYING OUT THE INVENTION

The invention will be described below in detail with reference to the drawings illustrating embodiments.

FIRST EMBODIMENT

Figure 1:
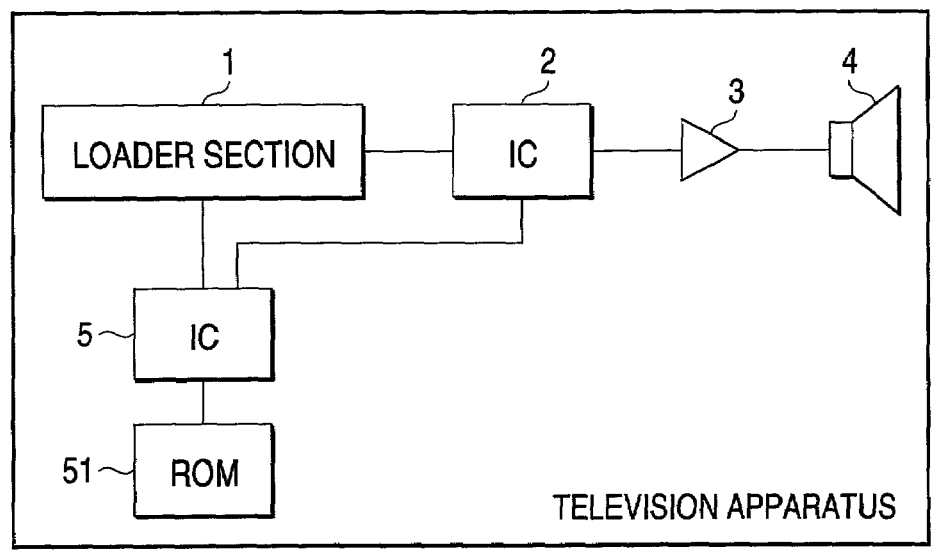
[FIG. 1]

FIG. 1 is a block diagram showing the structure of a television apparatus according to a first embodiment of the invention.

In FIG. 1, 1 denotes a loader section for reading data of a DVD and a CD, converting the data into an analog signal indicative of a voice and outputting the analog signal. The loader section 1 is connected to an IC 2, and the IC 2 serves to change the level of the analog signal and to output the analog signal corresponding to a volume set value specified by a user during volume setting as will be described below when the user operates an operation panel (not shown) to set the volume.

The loader section 1 serves to decide whether a disc attached to be a reproducing object is a DVD or a CD and to output a decision signal corresponding to the result, and the decision signal is sent to an IC 5. The IC 5 is connected to a ROM 51 and the ROM 51 stores a level change rate and a volume set value corresponding to each other as will be described below.

Figure 2:
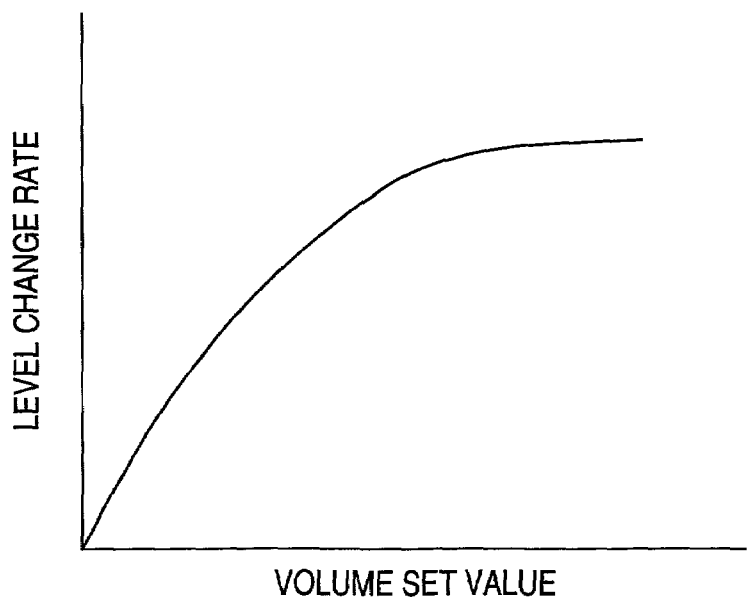
FIG. 2 is a graph illustrating the relationship of correspondence between a level change rate and a volume set value which are recorded in a ROM of the television apparatus according to the first embodiment,
[FIG. 3]

FIG. 2 is a graph illustrating the relationship of correspondence between the level change rate and the volume set value which are recorded in the ROM 51 of the television apparatus according to the first embodiment. In FIG. 2, an axis of ordinate indicates the level change rate and an axis of abscissa indicates the volume set value. As shown in FIG. 2, the level change rate is determined to be increased with an increase in the volume set value, and the ratio of the increase in the level change rate is decreased with the increase in the volume set value.

Figure 3:
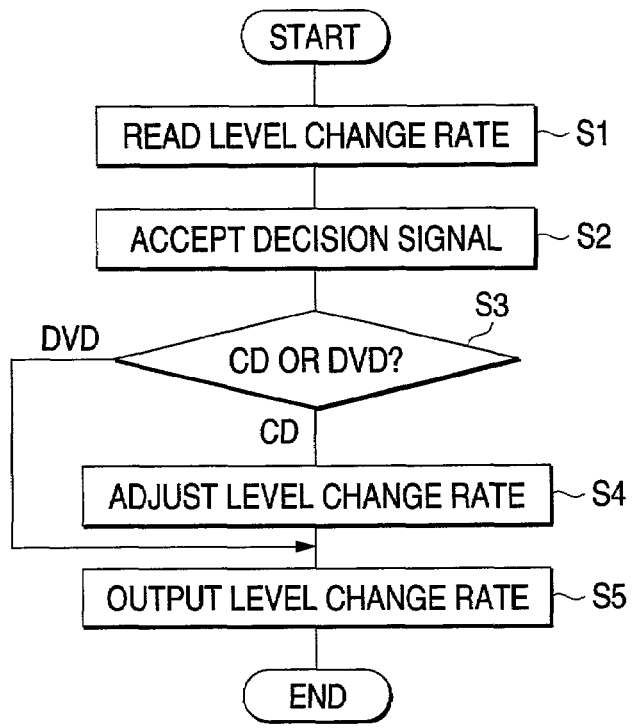
FIG. 3 is a flow chart showing the processing procedure of an IC in the television apparatus according to the first embodiment,
[FIG. 4]

FIG. 3 is a flow chart showing the processing procedure of the IC 5 in the television apparatus according to the first embodiment. The IC 5 first reads a level change rate corresponding to a volume set value specified by a user from the ROM 51 (Step 1). Then, the IC 5 accepts a decision signal sent from the loader section 1 (Step 2) and decides whether a disc D to be a reproducing object is a DVD or a CD in response to the decision signal (Step 3). If the disc D to be the reproducing object is the DVD at the Step 3, the process proceeds to Step 5. On the other hand, if the disc D to be the reproducing object is the CD at the Step 3, the level change rate read at the Step 1 is adjusted with a predetermined adjusting rate (Step 4). The adjusting rate used in the Step 4 is a constant determined within a range of 0 to 1 to decrease the level change rate read at the Step 1 at a constant ratio and a product of the level change rate and the adjusting rate is set to be a new level change rate. Then, the level change rate is output to the IC 2 (Step 5) and the process is ended.

While the product of the level change rate and the adjusting rate is calculated to be a new level change rate in the process of adjusting the level change rate, a constant may be decreased from the read level change rate and the result may be set to be a new level change rate, for example.

Then, the level change rate output from the IC 5 is input to the IC 2. The IC 2 changes the level of an input analog signal at the input level change rate and outputs the signal.

An amplifying circuit 3 is connected to the IC 2 to amplify the level of the analog signal output from the IC 2 at a constant amplification rate. A speaker 4 is connected to the rear stage of the amplifying circuit 3 to output, as an audio sound, a voice represented by the analog signal having a level amplified by the amplifying circuit 3.

Figure 4:
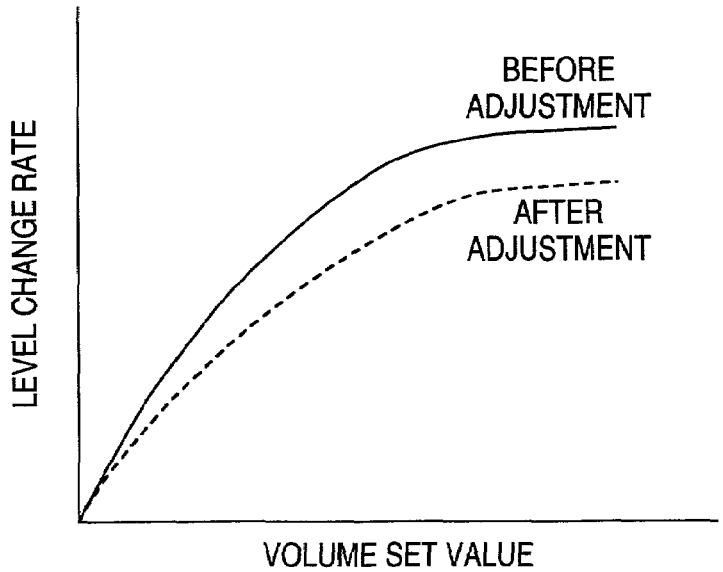
FIG. 4 is a graph illustrating a difference in the relationship of correspondence between a level change rate and a volume set value during the reproduction of each of a CD and a DVD,
[FIG. 5]

FIG. 4 is a graph illustrating a difference in the relationship of correspondence between a level change rate and a volume set value when each of the CD and the DVD is to be reproduced. In FIG. 4, an axis of ordinate indicates the level change rate and an axis of abscissa indicates the volume set value. Moreover, a solid line represents the relationship of correspondence between the volume set value and the level change rate which is obtained when the DVD is to be reproduced and a broken line represents the relationship of correspondence between the volume set value and the level change rate which is obtained when the CD is to be reproduced. As shown in FIG. 4, the level change rate obtained during the reproduction of the CD is decreased at a constant rate as compared with the level change rate obtained during the reproduction of the DVD. Consequently, a volume level obtained during the reproduction of the CD is more decreased than that obtained during the reproduction of the DVD.

While the level change rate obtained during the reproduction of the DVD is not adjusted and the level change rate obtained during the reproduction of the DC is adjusted to be more decreased than the level change rate obtained during the reproduction of the DVD in the first embodiment, it is apparent that the level change rate obtained during the reproduction of the DVD and the level change rate obtained during the reproduction of the CD may be adjusted at different adjusting rates from each other and that the level change rate obtained during the reproduction of the CD is not adjusted but the level change rate obtained during the reproduction of the DVD may be adjusted to be more increased than the level change rate obtained during the reproduction of the CD, for example.

Figure 5:
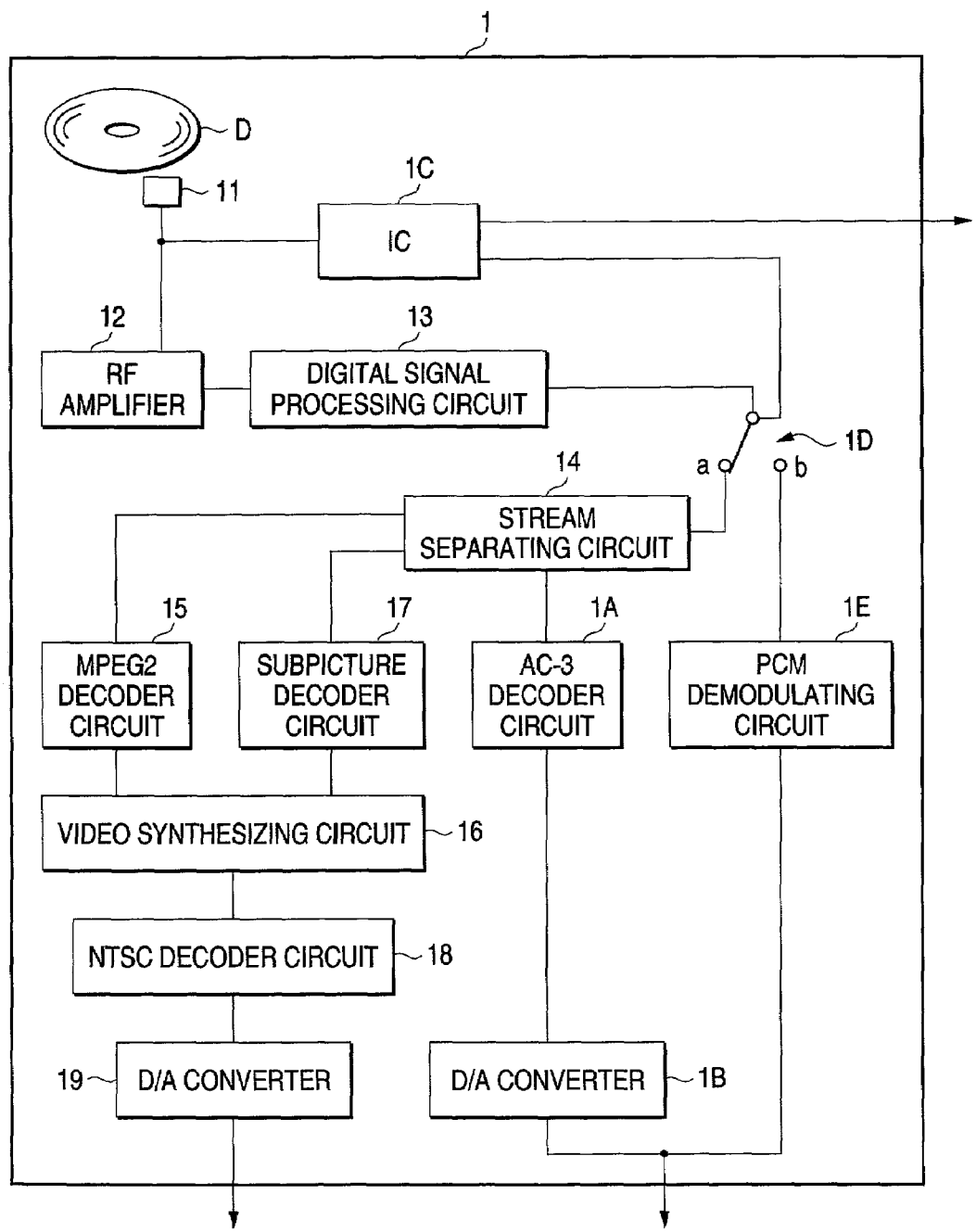
FIG. 5 is a block diagram showing the structure of a loader section,
[FIG. 6]

Next, the structure of the loader section 1 will be described. FIG. 5 is a block diagram showing the structure of the loader section 1. The loader section 1 includes a pick-up 11 for reading data from a disc D to be a DVD or a CD. To the pick-up 11 is connected an IC 1C for deciding whether the disc D to be a reproducing object is the DVD or the CD depending on the output of the pick-up 11, and a decision signal output from the IC 1C is sent to the IC 5 described above. Moreover, the IC 1C is connected to a switch 1D. The switch 1D is connected to an a side in the drawing if the disc D to be the reproducing object is the DVD, and the switch 1D is connected to a b side in the drawing if the disc D to be the reproducing object is the CD. Furthermore, the IC 1C serves to control switching of an objective lens of the pick-up 11 into an objective lens for the DVD or the CD depending on whether the disc D to be the reproducing object is the DVD or the CD.

In the case in which the disc D to be the reproducing object is the DVD, a signal read from the disc D through the pick-up 11 is converted into digital data by an RF amplifier 12 and the data are given to a digital signal processing circuit 13. In the digital signal processing circuit 13, a process such as error correction is carried out over the digital data input from the RF amplifier 12, and the digital data output from the digital signal processing circuit 13 are transmitted to a stream separating circuit 14 because the switch 1D is connected to the a side.

The stream separating circuit 14 separates the digital data given from the digital signal processing circuit 13 to each bit stream of a subpicture such as video, audio or subtitles information. A video bit stream is input to an MPEG2 decoder circuit 15. The video bit stream is compression coded by an MPEG2 method, and is expanded and decoded in the MPEG2 decoder circuit 15 and is then converted into a digital video signal to be input to one of input terminals of a video synthesizing circuit 16.

A subpicture bit stream output from the stream separating circuit 14 is input to a subpicture decoder circuit 17 and is subjected to an expanding process to be a digital subpicture signal, and the digital subpicture signal is then input to the other input terminal of the video synthesizing circuit 16.

The digital subpicture signal input to the video synthesizing circuit 16 is synthesized with the digital video signal input to the video synthesizing circuit 16, and a digital video signal thus obtained is output to an NTSC decoder circuit 18. The NTSC decoder circuit 18 converts the input digital video signal into a digital signal indicative of a video in an NTSC method, and the digital signal is D/A converted by a D/A converter 19 and is output to the outside of the loader section 1.

On the other hand, an audio bit stream output from the stream separating circuit 14 is input to an AC-3 decoder circuit 1A. The audio bit stream is compression coded by an AC-3 method. In the AC-3 decoder circuit 1A, the audio bit stream is expanded and decoded and is thus converted into a digital audio signal.

The digital audio signal thus obtained is input to a D/A converter 1B connected to the AC-3 decoder circuit 1A and is D/A converted, and is then output, to the IC 2, as an analog signal indicative of a voice.

Moreover, in the case in which the disc D to be the reproducing object is the CD, the signal read from the disc D through the pick-up 11 is converted into digital data by the RF amplifier 12 and the digital data are given to the digital signal processing circuit 13. In the digital signal processing circuit 13, a process such as error correction is carried out over the digital data input from the RF amplifier 12 and the digital data output from the digital signal processing circuit 13 are given to a PCM demodulating circuit 1E because the switch 1D is connected to the b side.

The PCM demodulating circuit 1E PCM demodulates the transmitted digital data to be an analog signal, and the analog signal indicative of a voice is output to the IC 2.

With such a structure, when the DVD is to be reproduced, the level change rate is not adjusted by the IC 5 but is exactly output to the IC 2 and the IC 2 changes the level of a voice signal by using the level change rate. On the other hand, when the CD is to be reproduced, the IC 5 adjusts the level change rate to be more decreased than the level change rate obtained during the reproduction of the DVD and outputs the level change rate to the IC 2, and the IC 2 changes the level of a voice signal by using the level change rate. Thus, it is possible to equalize volume levels during the reproduction of the DVD and the CD.

SECOND EMBODIMENT

Figure 6:
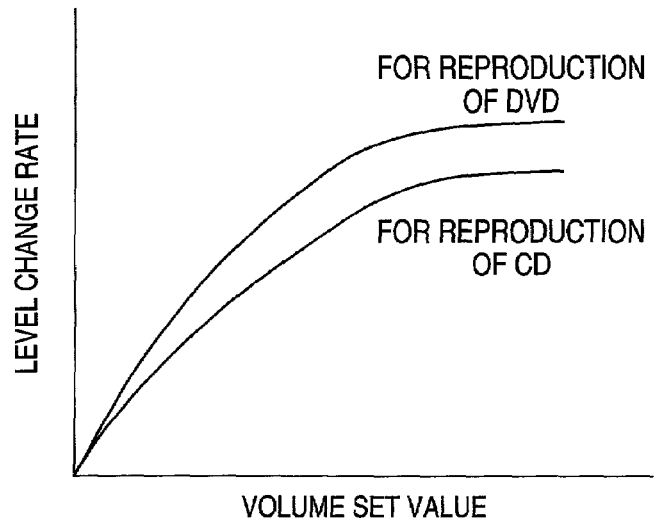
FIG. 6 is a graph illustrating the relationship of correspondence between a level change rate and a volume set value which are recorded in a ROM of a television apparatus according to a second embodiment,
[FIG. 7]

FIG. 6 is a graph illustrating the relationship of correspondence between a level change rate and a volume set value which are recorded in a ROM 51 of a television apparatus according to a second embodiment. In FIG. 6, an axis of ordinate indicates the level change rate and an axis of abscissa indicates the volume set value. As shown in FIG. 6, in the television apparatus according to the second embodiment, the ROM 51 stores both of the relationship of correspondence between a level change rate and a volume set value for the reproduction of a CD and the relationship of correspondence between a level change rate and a volume set value for the reproduction of a DVD. Each of the relationships of correspondence is determined such that the level change rate is increased with an increase in the volume set value, and the ratio of the increase in the level change rate is decreased with the increase in the volume set value. Over the whole area of the volume set value, moreover, the level change rate for the reproduction of the CD is set to be smaller than the level change rate for the reproduction of the DVD.

Figure 7:
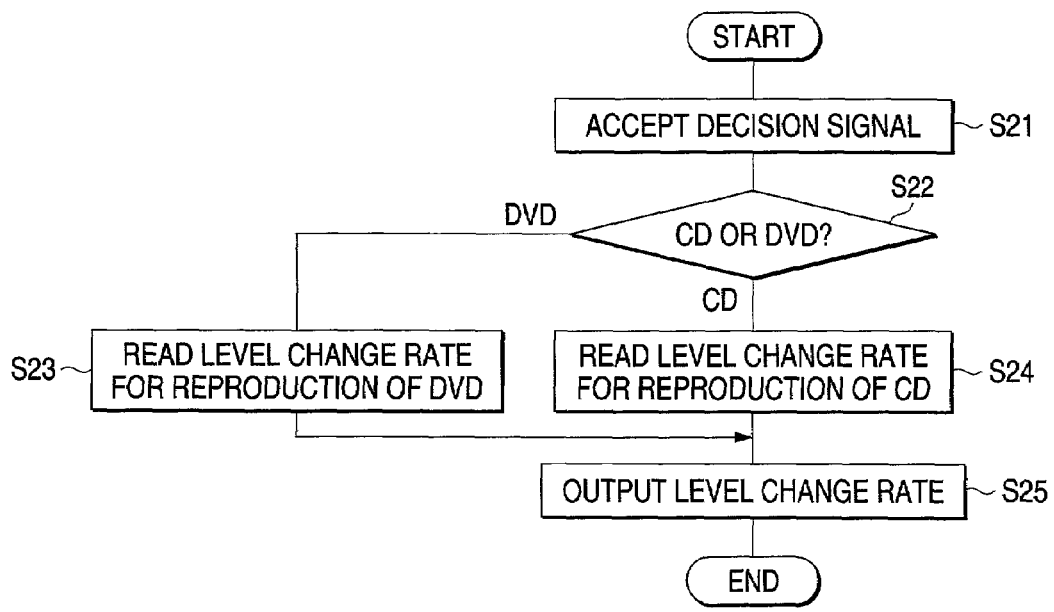
FIG. 7 is a flow chart showing the processing procedure of an IC in the television apparatus according to the second embodiment,
[FIG. 8]

FIG. 7 is a flow chart showing the processing procedure of an IC 5 in the television apparatus according to the second embodiment. The IC 5 first accepts the decision signal of a loader section 1 (Step 21) and decides whether a disc D to be a reproducing object is a DVD or a CD in response to the decision signal (Step 22). If the disc D to be the reproducing object is the DVD at the Step 22, a level change rate corresponding to a volume set value specified by a user is read from the ROM 51 by using the relationship of correspondence between the level change rate and the volume set value for the reproduction of the DVD (Step 23) and the process proceeds to Step 25. On the other hand, if the disc D to be the reproducing object is the CD at the Step 22, a level change rate corresponding to the volume set value specified by the user is read from the ROM 51 by using the relationship of correspondence between the level change rate and the volume set value for the reproduction of the CD (Step 24) and is then output to an IC 2 (Step 25), and the process is ended.

Moreover, since the structure of the television apparatus according to the second embodiment is the same as that of the television apparatus according to the first embodiment, description will be omitted.

With such a structure, when the DVD is to be reproduced, the level change rate for the DVD is read by the IC 5 and is output to the IC 2 and the IC 2 changes the level of a voice signal by using the level change rate. On the other hand, when the CD is to be reproduced, the level change rate for the CD is read by the IC 5 and is output to the IC 2 and the IC 2 changes the level of a voice signal by using the level change rate. By properly determining the level change rate during the reproduction of the CD and the level change rate during the reproduction of the DVD, accordingly, it is possible to equalize volume levels during the reproduction of the DVD and the CD.

THIRD EMBODIMENT

Figure 8:
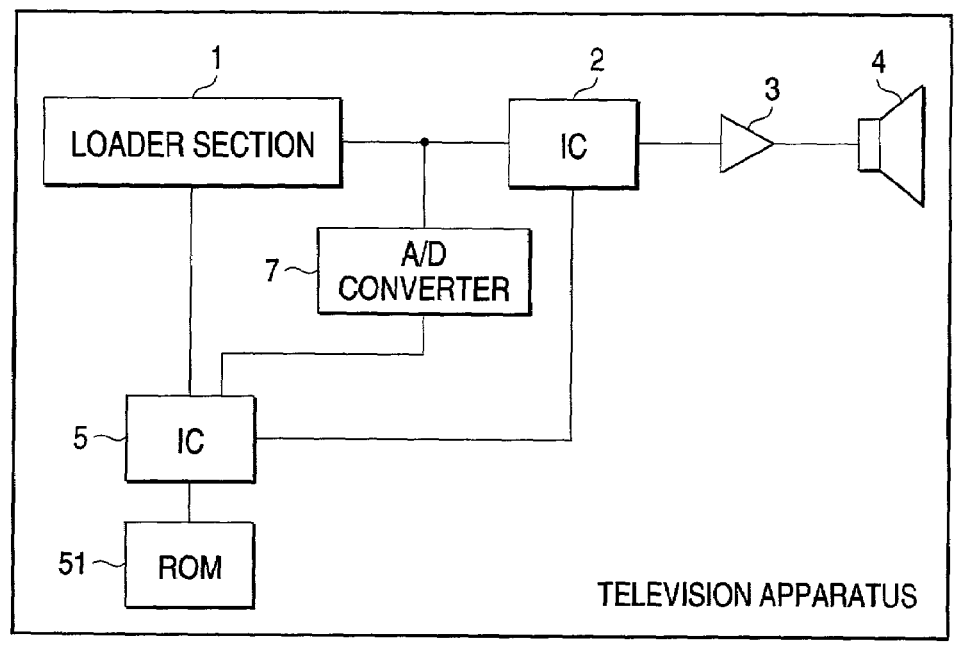
FIG. 8 is a block diagram showing the structure of a television apparatus according to a third embodiment of the invention,
[FIG. 9]

FIG. 8 is a block diagram showing the structure of a television apparatus according to a third embodiment of the invention. An input side terminal of an A/D converter 7 is connected to the interconnecting point of a loader section 1 and an IC 2 and an output side terminal of the A/D converter 7 is connected to an IC 5. Consequently, the analog signal of a voice output from the loader section 1 to the IC 2 is A/D converted by the A/D converter 7 and a digital signal thus obtained is input to the IC 5. Moreover, in the case in which a new disc D is attached to the loader section 1, the loader section 1 outputs, to the IC 5, a signal indicative of the attachment of the disc. Furthermore, since other structures of the television apparatus according to the third embodiment are the same as those of the television apparatus according to the first embodiment, description thereof will be omitted.

Figure 9:
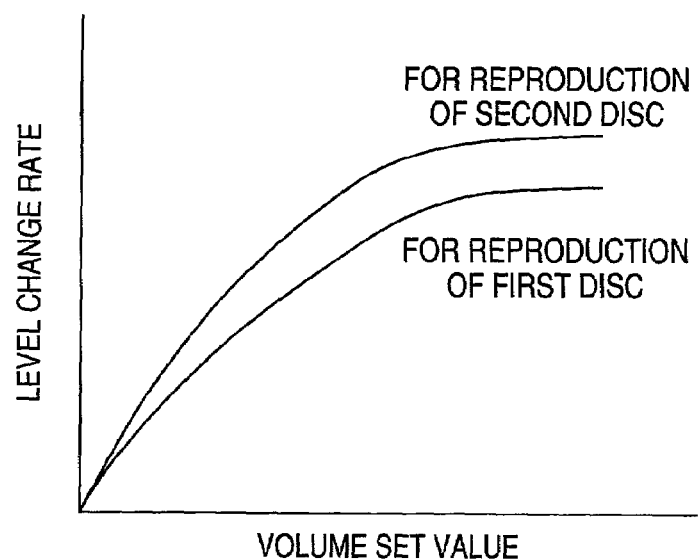
FIG. 9 is a graph illustrating the relationship of correspondence between a level change rate and a volume set value which are recorded in a ROM of the television apparatus according to the third embodiment,
[FIG. 10]

FIG. 9 is a graph illustrating the relationship of correspondence between a level change rate and a volume set value which are recorded in a ROM 51 of the television apparatus according to the third embodiment. In FIG. 9, an axis of ordinate indicates a level change rate and an axis of abscissa indicates a volume set value. As shown in FIG. 9, in the television apparatus according to the third embodiment, the ROM 51 stores both of the relationship of correspondence between a level change rate and a volume set value for the reproduction of a disc (hereinafter referred to as a first disc) having a maximum level L in the recording levels of voice data included in all the recorded data which exceeds a previously given threshold T and the relationship of correspondence between a level change rate and a volume set value in a disc (hereinafter referred to as a second disc) having the maximum level L which does not exceed the threshold T. Each of the relationships of correspondence is determined such that the level change rate is increased with an increase in the volume set value and the ratio of the increase in the level change rate is decreased with the increase in the volume set value. Over the whole area of the volume set value, moreover, a level change rate for the reproduction of the first disc is set to be smaller than a level change rate for the reproduction of the second disc.

Figure 10:
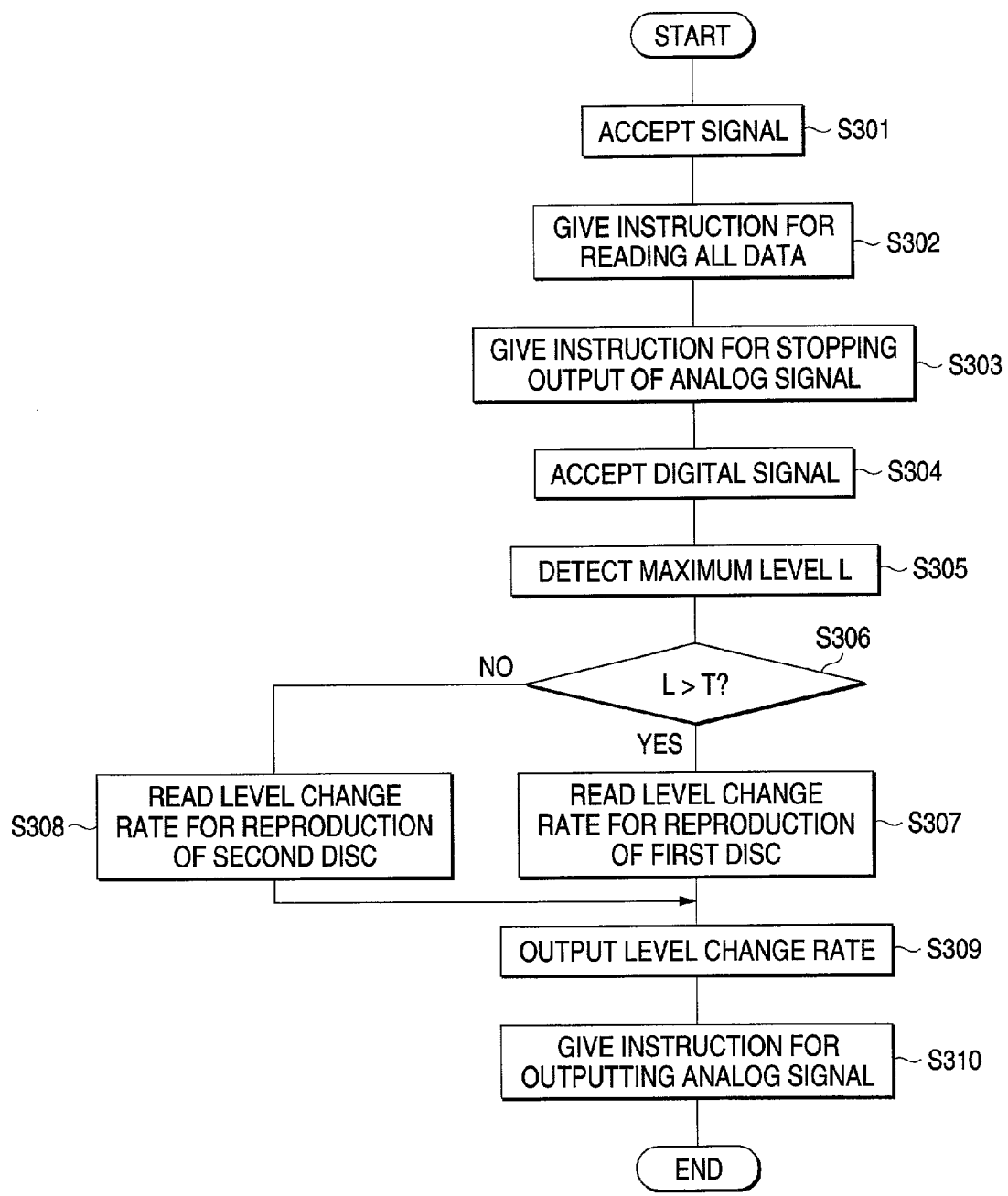
FIG. 10 is a flow chart showing the processing procedure of an IC in the television apparatus according to the third embodiment,
[FIG. 11]

FIG. 10 is a flow chart showing the processing procedure of the IC 5 of the television apparatus according to the third embodiment. The IC 5 accepts a signal from the loader section 1 (Step 301). In the case in which a new disc D is attached to the loader section 1, an instruction for reading all the data of the disc D is given to the loader section 1 (Step 302). The loader section 1 reads all the data from the disc D upon receipt of the instruction, converts the same data into an analog signal indicative of a voice and then outputs the analog signal to the IC 2. Moreover, the IC 5 gives such an instruction as not to output the analog signal to the IC2 (Step 303). The IC 2 stops the output of the analog signal upon receipt of the instruction.

The analog signal output to the IC 2 is converted into a digital signal through the A/D converter 7 and the digital signal is input to the IC 5. The IC 5 accepts the digital signal (Step 304) and detects the maximum level L in the recording levels of voice data included in the digital signal (Step 305). Then, it is decided whether or not the maximum level L exceeds the threshold T (Step 306). If the maximum level L exceeds the threshold T, a level change rate corresponding to a volume set value specified by a user is read from the ROM 51 by using the relationship of correspondence between the level change rate and the volume set value for the reproduction of the first disc (Step 307) and the process proceeds to Step 309. On the other hand, if the maximum level L does not exceed the threshold T at the Step 306, a level change rate corresponding to the volume set value specified by the user is read from the ROM 51 by using the relationship of correspondence between the level change rate and the volume set value for the reproduction of the second disc (Step 308) and is output to the IC 2 (Step 309) and an instruction for outputting an analog signal is given to the IC 2 (Step 310), and the process is ended.

With such a structure, when the first disc having a high recording level of voice data such as a CD is to be reproduced, a level change rate for the reproduction of the first disc is read through the IC 5 and is output to the IC 2 and the IC 2 changes the level of a voice signal by using the level change rate. On the other hand, when the second disc having a low recording level of voice data such as a DVD is to be reproduced, a level change rate for the reproduction of the second disc is read through the IC 5 and is output to the IC 2 and the IC 2 changes the level of a voice signal by using the level change rate. By properly determining the level change rate for the reproduction of the first disc and the level change rate for the reproduction of the second disc, accordingly, it is possible to equalize volume levels during the reproduction of a disc having the high recording level of voice data and a disc having the low recording level.

FOURTH EMBODIMENT

Figure 11:
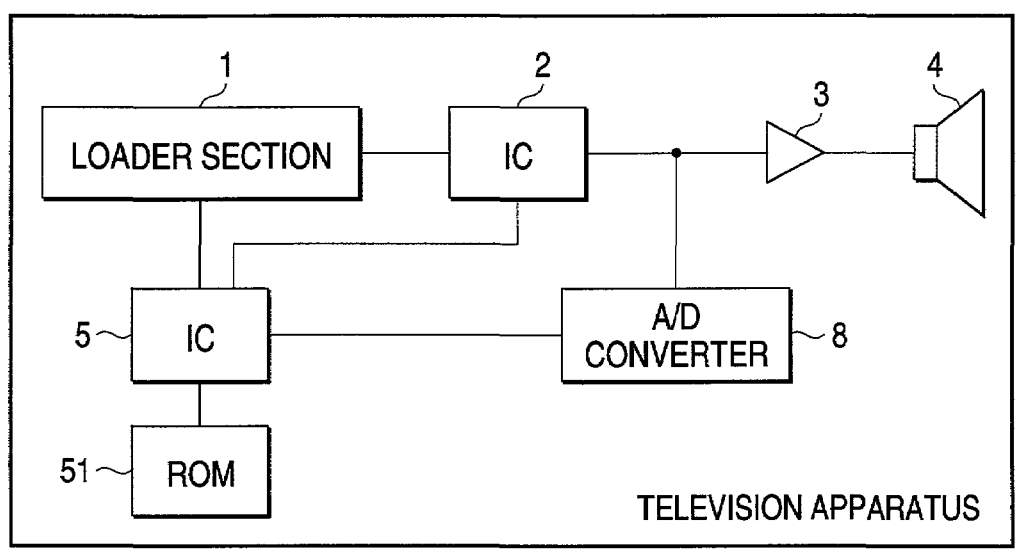
FIG. 11 is a block diagram showing the structure of a television apparatus according to a fourth embodiment of the invention, and
[FIG. 12]

FIG. 11 is a block diagram showing the structure of a television apparatus according to a fourth embodiment of the invention. An input side terminal of an A/D converter 8 is connected to the interconnecting point of an IC 2 and an amplifying circuit 3 and an output side terminal of the A/D converter 8 is connected to an IC 5. Consequently, the analog signal of a voice output from the IC 2 to the amplifying circuit 3 is A/D converted by the A/D converter 8 and a digital signal thus obtained is input to the IC 5. Moreover, in the case in which a new disc D is attached to the loader section 1, the loader section 1 outputs, to the IC 5, a signal indicative of the attachment of the disc. Furthermore, since other structures of the television apparatus according to the fourth embodiment are the same as those of the television apparatus according to the first embodiment, description thereof will be omitted.

Since the contents of storage related to the relationship of correspondence between a level change rate and a volume set value in a ROM 51 of the television apparatus according to the fourth embodiment are the same as the contents of storage related to the relationship of correspondence between the level change rate and the volume set value in the ROM 51 of the television apparatus according to the third embodiment, description thereof will be omitted.

FIG. 12 is a flow chart showing the processing procedure of the IC 5 in the television apparatus according to the fourth embodiment. The IC 5 accepts a signal from the loader section 1 (Step 401). In the case in which a new disc D is attached to the loader section 1, an instruction for reading all the data of the disc D is given to the loader section 1 (Step 402). The loader section 1 reads all the data from the disc D upon receipt of the instruction, converts the same data into an analog signal indicative of a voice and then outputs the analog signal to the IC 2. The IC 2 changes the level of the analog signal by using a level change rate obtained at this time and outputs the signal.

The analog signal output from the IC 2 is converted into a digital signal through the A/D converter 8 and the digital signal is input to the IC 5. The IC 5 accepts the digital signal (Step 403) and detects a maximum level L1 in the recording levels of voice data included in the digital signal (Step 404). Then, the IC 5 reads a current level change rate (Step 405) and calculates, from the maximum level L1, a level L2 which has not been changed with the level change rate (Step 406). It is decided whether or not the level L2 exceeds a threshold T (Step 407). If the level L2 exceeds the threshold T, a level change rate corresponding to a volume set value specified by a user is read from the ROM 51 by using the relationship of correspondence between the level change rate and the volume set value for the reproduction of the first disc (Step 408) and the process proceeds to Step 410. On the other hand, if the level L2 does not exceed the threshold T at the Step 407, a level change rate corresponding to the volume set value specified by the user is read from the ROM 51 by using the relationship of correspondence between the level change rate and the volume set value for the reproduction of the second disc (Step 409) and is output to the IC 2 (Step 410), and the process is ended.

With such a structure, when the first disc having a high recording level of voice data such as a CD is to be reproduced, a level change rate for the reproduction of the first disc is read through the IC 5 and is output to the IC 2 and the IC 2 changes the level of a voice signal by using the level change rate. On the other hand, when the second disc having a low recording level of voice data such as a DVD is to be reproduced, a level change rate for the reproduction of the second disc is read through the IC 5 and is output to the IC 2 and the IC 2 changes the level of a voice signal by using the level change rate. By properly determining the level change rate for the reproduction of the first disc and the level change rate for the reproduction of the second disc, accordingly, it is possible to equalize volume levels during the reproduction of a disc having the high recording level of voice data and a disc having the low recording level.

[Effect of the Invention]

As described above in detail, according to the television apparatus in accordance with the first aspect of the invention, the level change rate corresponding to the volume set value accepted by the accepting section is adjusted separately depending on whether the reproducing object is the first recording medium or the second recording medium, and the level of the voice signal is changed based on the level change rate. Consequently, it is possible to equalize the volume level at which the data of the first recording medium are to be reproduced and the volume level at which the data of the second recording medium are to be reproduced.

According to the television apparatus in accordance with the second aspect of the invention, the level change rate is adjusted by using the first adjusting rate when the reproducing object is the first recording medium and is adjusted by using the second adjusting rate when the reproducing object is the second recording medium. Thus, the level of the voice signal is changed. By properly determining the first adjusting rate and the second adjusting rate, accordingly, it is possible to equalize the volume level at which the data of the first recording medium are to be reproduced and the volume level at which the data of the second recording medium are to be reproduced.

According to the television apparatus in accordance with the third aspect of the invention, the first level change rate and the second level change rate corresponding to the volume set values respectively are previously stored in the storage section. The level of the voice signal is changed by using the first level change rate when the reproducing object is the first recording medium, and the level of the voice signal is changed by using the second level change rate when the reproducing object is the second recording medium. By properly determining the first level change rate and the second level change rate, accordingly, it is possible to equalize the volume level at which the data of the first recording medium are to be reproduced and the volume level at which the data of the second recording medium are to be reproduced.

According to the television apparatus in accordance with the fourth aspect of the invention, the two different level change rates corresponding to the volume set values respectively are previously stored in the storage section, and one of the level change rates is selected based on whether or not the level of the voice signal output from the voice signal output section exceeds the predetermined value and the level of the voice signal is changed by using the level change rate thus selected. By properly determining the two level change rates, accordingly, it is possible to equalize the volume level at which the voice data having a high recording level are to be reproduced and the volume level at which voice data having a low recording level are to be reproduced irrespective of the first recording medium and the second recording medium.

According to the television apparatus in accordance with the fifth aspect of the invention, the maximum level of the voice signal obtained after the conversion is detected from all the data of the first recording medium or the second recording medium to be the reproducing object, and the magnitude of the recording level of the voice data recorded in the reproducing object is decided based on the result of the detection. Thus, it is possible to accurately decide the magnitude of the recording level and to more accurately equalize the volume level at which the voice data having a high recording level are to be reproduced and the volume level at which the voice data having a low recording level are to be reproduced.

According to the television apparatus in accordance with the sixth aspect of the invention, the two different level change rates corresponding to the volume set values respectively are previously stored in the storage section, the level of the voice signal which has been changed by the level changing section is detected, and the level of the voice signal which has not been changed is calculated based on the result of the detection and the level change rate used for the change of the level which is carried out by the level changing section. One of the level change rates is selected based on whether or not the level exceeds the predetermined value, and the level of the voice signal is changed by using the level change rate thus selected. By properly determining the two level change rates, accordingly, it is possible to equalize the volume level at which the voice data having a high recording level are to be reproduced and the volume level at which the voice data having a low recording level are to be reproduced irrespective of the first recording medium and the second recording medium.

According to the television apparatus in accordance with the seventh aspect of the invention, the maximum level of the voice signal obtained after the change of the level is detected from all the data of the first recording medium or the second recording medium to be the reproducing object, and the magnitude of the recording level of the voice data recorded in the reproducing object is decided based on the result of the detection and the level change rate used for changing the level by the level changing section. Thus, it is possible to accurately decide the magnitude of the recording level and to more accurately equalize the volume level at which the voice data having a high recording level are to be reproduced and the volume level at which the voice data having a low recording level are to be reproduced. Thus, the invention produces excellent effects.

What is claimed is:

1. A television apparatus comprising:
   a reading section for reading data from a first recording medium recording data indicative of a voice and from a second recording medium recording data indicative of a voice and an image,
   a voice signal converting section for converting the data read by said reading section into a voice signal,
   an accepting section for accepting a volume set value indicative of a volume of a voice to be reproduced,
   a storage section for storing a level change rate indicative of a rate for changing a level of the voice signal corresponding to a plurality of volume set values respectively, the level of the voice signal output from said voice signal converting section being changed based on the level change rate corresponding to the volume set value accepted by said accepting section,
   deciding section for deciding whether a reproducing object is the first recording medium or the second recording medium, and
   change rate adjusting section for adjusting the level change rate corresponding to the volume set value accepted by said accepting section corresponding to a result of the decision obtained by said deciding section.

2. The television apparatus according to claim 1, wherein said change rate adjusting section serves to adjust, at a first adjusting rate, the level change rate corresponding to the volume set value accepted by said accepting section when said deciding section decides that the reproducing object is the first recording medium, and to adjust the level change rate at a second adjusting rate which is different from the first adjusting rate when said deciding section decides that the reproducing object is the second recording medium.

3. A television apparatus comprising:
   a reading section for reading data from a first recording medium recording data indicative of a voice and from a second recording medium recording data indicative of a voice and an image,
   a voice signal converting section for converting the data read by said reading section into a voice signal,
   an accepting section for accepting a volume set value indicative of a volume of a voice to be reproduced, the voice represented by the voice signal being output with a volume corresponding to the volume set value accepted by said accepting section,
   a storage section for storing a first level change rate indicative of a rate at which a level of a voice signal is to be changed and a second level change rate indicative of a rate at which the level of the voice signal is to be changed and different from the first level change rate corresponding to a plurality of volume set values respectively,
   deciding section for deciding whether a reproducing object is the first recording medium or the second recording medium, and
   a level changing section for changing the level of the voice signal based on the first level change rate corresponding to the volume set value accepted by said accepting section when said deciding section decides that the reproducing object is the first recording medium, and for changing the level of the voice signal based on the second level change rate corresponding to the volume set value accepted by said accepting section when said deciding section decides that the reproducing object is the second recording medium.

4. A television apparatus comprising:
a reading section for reading data from a first recording medium recording data indicative of a voice and from a second recording medium recording data indicative of a voice and an image,
a voice signal converting section for converting the data read by said reading section into a voice signal,
an accepting section for accepting a volume set value indicative of a volume of a voice to be reproduced, the voice represented by the voice signal being output with a volume corresponding to the volume set value accepted by said accepting section,
a storage section for storing two different level change rates indicative of rates at which a level of the voice signal is to be changed corresponding to a plurality of volume set values respectively,
a level detecting section for detecting a level of the voice signal output from said voice signal converting section,
deciding section for deciding whether or not the level detected by said level detecting section exceeds a predetermined value, and
a level changing section for selecting one of the two level change rates corresponding to the volume set value accepted by said accepting section based on a result of the decision obtained by said deciding section, and for changing the level of the voice signal based on the selected level change rate.

5. The television apparatus according to claim 4, wherein said level detecting section serves to read all data of the first recording medium or the second recording medium to be a reproducing object by the reading section, and to detect a maximum level of a voice signal obtained after the conversion carried out by said voice signal converting section from all the read data.

6. A television apparatus comprising:
a reading section for reading data from a first recording medium recording data indicative of a voice and from a second recording medium recording data indicative of a voice and an image,
a voice signal converting section for converting the data read by said reading section into a voice signal,
an accepting section for accepting a volume set value indicative of a volume of a voice to be reproduced,
a voice represented by the voice signal being output at a level corresponding to the volume set value accepted by said accepting section,
a storage section for storing two different level change rates indicative of rates at which a level of the voice signal is to be changed corresponding to a plurality of volume set values respectively,
a level changing section for changing the level of the voice signal based on the two level change rates corresponding to the volume set value accepted by said accepting section,
level detecting section for detecting the level of the voice signal obtained after the change carried out by said level changing section,
calculating section for calculating a level of the voice signal which is not changed by said level changing section based on the level detected said the level detecting section and the two level change rates corresponding to the volume set value accepted by said accepting section, and
deciding section for deciding whether or not the level calculated by said calculating section exceeds a predetermined value, wherein
said level changing section serves to select one of the two level change rates corresponding to the volume set value accepted by said accepting section based on a result of the decision obtained by said deciding section, and to change the level of the voice signal based on the selected level change rate.

7. The television apparatus according to claim 6, wherein said level detecting section serves to read all data of the first recording medium or the second recording medium to be a reproducing object by said reading section, and to detect a maximum level of a voice signal obtained after the change carried out by said level changing section from all the read data.

* * * * *